(12) United States Patent
Couasnon et al.

(10) Patent No.: US 11,472,314 B2
(45) Date of Patent: Oct. 18, 2022

(54) ADJUSTMENT MECHANISM FOR MOTOR VEHICLE SEAT

(71) Applicant: FAURECIA Sièges d'Automobile, Nanterre (FR)

(72) Inventors: Christian Couasnon, Flers (FR); Matthieu Detienne, La Carneille (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/208,411

(22) Filed: Mar. 22, 2021

(65) Prior Publication Data
US 2021/0291703 A1  Sep. 23, 2021

(30) Foreign Application Priority Data

Mar. 23, 2020 (FR) ........................................ 2002790

(51) Int. Cl.
*B60N 2/16* (2006.01)
(52) U.S. Cl.
CPC ............. *B60N 2/167* (2013.01); *B60N 2/168* (2013.01); *B60N 2/165* (2013.01)
(58) Field of Classification Search
CPC ....... B60N 2/1615; B60N 2/165; B60N 2/167
USPC .................................................... 297/344.15
See application file for complete search history.

(56) References Cited

U.S. PATENT DOCUMENTS

| 6,481,557 B2 | 11/2002 | Denis | |
| 2012/0273319 A1* | 11/2012 | Hur | B60N 2/168 192/15 |
| 2019/0016237 A1* | 1/2019 | Pleskot | B60N 2/161 |
| 2019/0338843 A1* | 11/2019 | Römer | F16H 57/023 |
| 2020/0282872 A1* | 9/2020 | Ng | F16D 67/02 |

FOREIGN PATENT DOCUMENTS

| FR | 2809999 A1 | 12/2001 |
| FR | 3028463 A1 | 5/2016 |
| FR | 3080808 A1 | 11/2019 |
| WO | 2015032639 A1 | 3/2015 |

OTHER PUBLICATIONS

French Search Report for French Patent App. No. FR2002790 dated Dec. 14, 2020, BET210035 FR, 10 pages, (No English Translation Available).

* cited by examiner

*Primary Examiner* — Sarah B McPartlin
(74) *Attorney, Agent, or Firm* — Barnes & Thornburg LLP (57) ABSTRACT

An adjustment assembly for a motor vehicle seat, comprising an adjustment mechanism and a flange that is part of a seat frame, the adjustment mechanism comprising: a housing, itself comprising a bottom and a cover, an output member having a base, an end opposite the base, and a pinion between the base and the end, the pinion being mounted to pivot about an axis of rotation, a backplate, comprising a base plate fixed to the flange and an upper part intended to partially receive the output member, a pumping mechanism housed in the housing and configured to drive the pinion in rotation, the output member being in contact in the flange and in the upper part, the flange and the upper part allowing rotation of the output member about the axis of rotation.

10 Claims, 7 Drawing Sheets

ADJUSTMENT MECHANISM FOR MOTOR VEHICLE SEAT

PRIORITY CLAIM

This application claims priority to French Patent Application No. FR2002790, filed Mar. 23, 2020, which is expressly incorporated by reference herein.

BACKGROUND

The present disclosure relates to the field of adjustment mechanisms for a vehicle seat. More particularly, the disclosure relates to an adjustment assembly for a motor vehicle seat comprising an adjustment mechanism and a flange that is part of a seat frame.

SUMMARY

According to the present disclosure, an adjustment assembly for a motor vehicle seat comprises an adjustment mechanism and a flange that is part of a seat frame.

In illustrative embodiments, the adjustment mechanism comprises a housing, itself comprising a bottom and a cover, an output member having a base, an end opposite the base, and a pinion between the base and the end, the pinion being mounted to pivot about an axis of rotation, a backplate, comprising a base plate fixed to the flange and an upper part intended to partially receive the output member, and a pumping mechanism housed in the housing and configured to drive the pinion in rotation, wherein the output member is in contact in the flange and in the upper part, the flange and the upper part allowing rotation of the output member about the axis of rotation.

In illustrative embodiments, the bottom of the housing may further comprise an assembly tab passing through the flange.

In illustrative embodiments, the flange has a first face arranged on the housing side and a second face arranged on the output member side, and the assembly tab bears against the second face of the flange.

In illustrative embodiments, the base plate of the backplate may further comprise an opening for receiving the assembly tab, said assembly tab passing through the backplate and bearing against the backplate, on the side opposite the housing.

In illustrative embodiments, the bottom of the housing may further comprise three tabs and the base plate of the backplate may comprise three openings to receive the assembly tabs, said assembly tabs passing through the backplate and bearing against the backplate, on the side opposite the housing.

In illustrative embodiments, the adjustment mechanism comprises a self-locking washer arranged on the end of the output member and bearing against the upper part of the backplate.

In illustrative embodiments, the flange comprises an orifice in contact with the base of the output member in order to prevent movements of the output member along a radial axis while allowing rotation of the output member within the orifice.

In illustrative embodiments, the output member may further comprise an additional guide piece surrounding the base, and the flange comprises an orifice in contact with the base of the output member in order to prevent movements of the output member along a radial axis while allowing rotation of the output member within the orifice.

In illustrative embodiments, the upper part of the backplate may further comprise a bearing in contact with the end of the output member, in order to prevent movements of the adjustment mechanism relative to the flange along a radial axis of the output member while allowing rotation of the output member within the orifice.

In illustrative embodiments, the pumping mechanism is connected to an input member and to the output member, the input member being mounted to pivot relative to the housing about an axis of rotation, this input member being resiliently biased towards a rest position and being movable in a first direction starting from the rest position, within a first angular sector, and in a second direction opposite to the first direction starting from the rest position, within a second angular sector, and the pumping mechanism rotates the output member when the input member moves in the first direction starting from the rest position or in the second direction starting from the rest position.

In illustrative embodiments, the pumping mechanism may further comprise a plurality of first and second locking members provided to immobilize the output member during the resilient return of the input member to the rest position.

In illustrative embodiments, the disclosure relates to a motor vehicle seat comprising an adjustment assembly as defined above. In particular, the seat may include a seating portion that is height-adjustable by a raising mechanism, the adjustment assembly controlling the raising movement.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
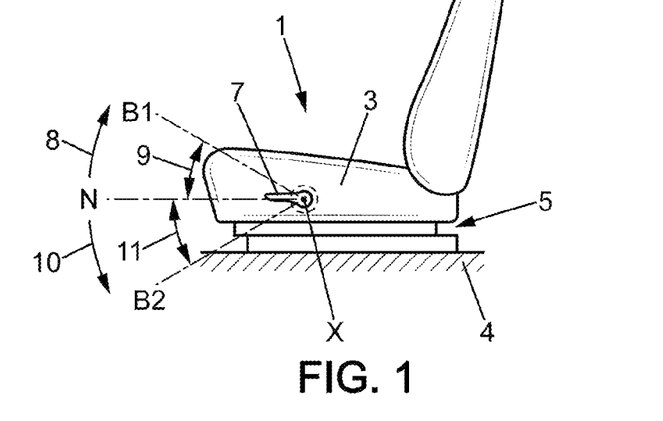
FIG. 1 is a schematic view of a vehicle seat in which the seating portion is height-adjustable by means of an adjustment assembly according to the disclosure.

FIG. 1 shows a motor vehicle seat 1 which comprises a backrest 2 carried by a seating portion 3 which itself is mounted on the floor 4 of the vehicle, for example by means of longitudinal slides 5. The seating portion 3 is connected to the slides 5 by means of a raising mechanism known per se (not shown) which allows adjusting the height of the seating portion 3. This raising mechanism is controlled by an adjustment mechanism 6 which itself is driven by an actuating means such as a control lever 7 (or a handle of different shape) mounted to pivot about a transverse horizontal axis of rotation X.

As shown in FIG. 1, the lever 7 may be a lever acting on a "pumping" control unit. In this configuration, the lever 7 is resiliently biased towards a rest position N, in which the lever may be arranged for example substantially horizontally. From this rest position N, the lever 7 can be moved:

in a first direction 8, within a first angular sector 9 defined between the rest position N and a first stop position B1, and in a second direction 10 opposite to the first direction 8, within a second angular sector 11 defined between the rest position N and a second stop position B2.

Figure 2:
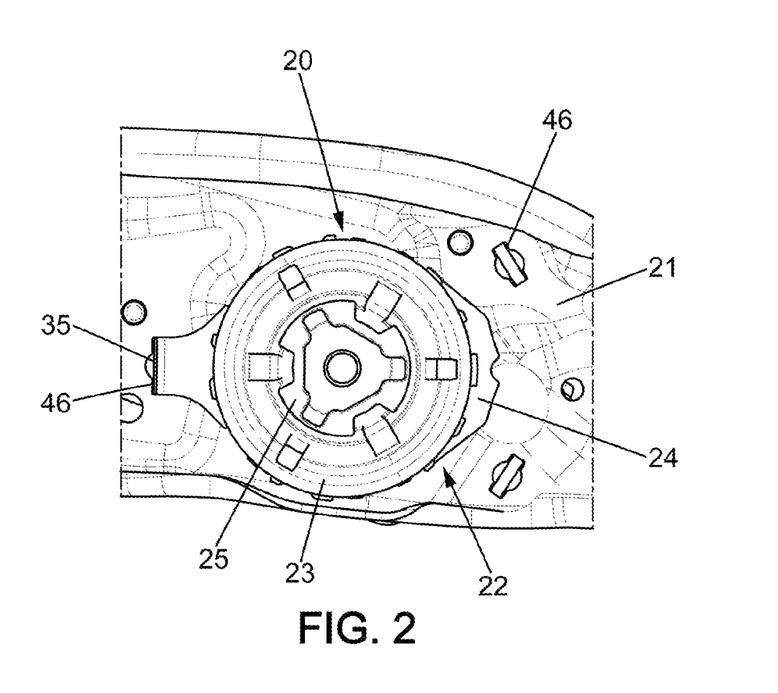
FIG. 2 is a front view of an exemplary embodiment of the adjustment assembly.

As shown in FIG. 2, the irreversible adjustment assembly comprises an adjustment mechanism 20 and a flange 21 that is part of a seat frame 1.

In particular, as shown in the figures, the adjustment mechanism 20 has a housing 22. The housing 22 is formed of a bottom 24 and a cover 23. The bottom 24 and the cover 23 are assembled to each other, for example by soldering, crimping, or the like.

The adjustment mechanism 20 further comprises an input member 25 and an output member 29. The input member 25 is mounted to pivot relative to the housing 22 about the axis of rotation X. The lever 7 is attached to the input member. The input member 25 is thus resiliently biased towards the rest position N and is movable in the first direction 8 starting from the rest position N, within the first angular sector 9, and in the second direction 10 opposite to the first direction starting from the rest position N, within the second angular sector 11.

The output member 29 is generally circular in shape with symmetry of revolution about the X axis. The output member 29 has a base 26, an end 27 opposite the base 26, and a pinion 28. The diameter of the base 26 is greater than that of the end 27. The pinion 28 is arranged between the base 26 and the end 27. The base 26 and the end 27 are circular and thus provide long guidance of the pinion 28 as well as partial attachment of the adjustment mechanism 20. As a result, translations along the Z and Y axes are eliminated, as well as rotations about the Z and Y axes. The output member 29, and in particular the pinion 28, is mounted to pivot about the axis of rotation X. The pinion 28 engages teeth 34 of an adjustment means of the seat 1.

In addition, the adjustment mechanism 20 is associated with the flange 21. More specifically, the flange 21 comprises a first face 36 and a second face 37. The first face 36 is arranged at the housing 22 side while the second face 37 is arranged at the output member 29 side. In other words, the flange 21 separates the adjustment mechanism 20 into two parts: a first "control" part comprising the housing 22 and the input member 25 and a second "adjustment" part comprising in particular the pinion 28.

Figure 4:
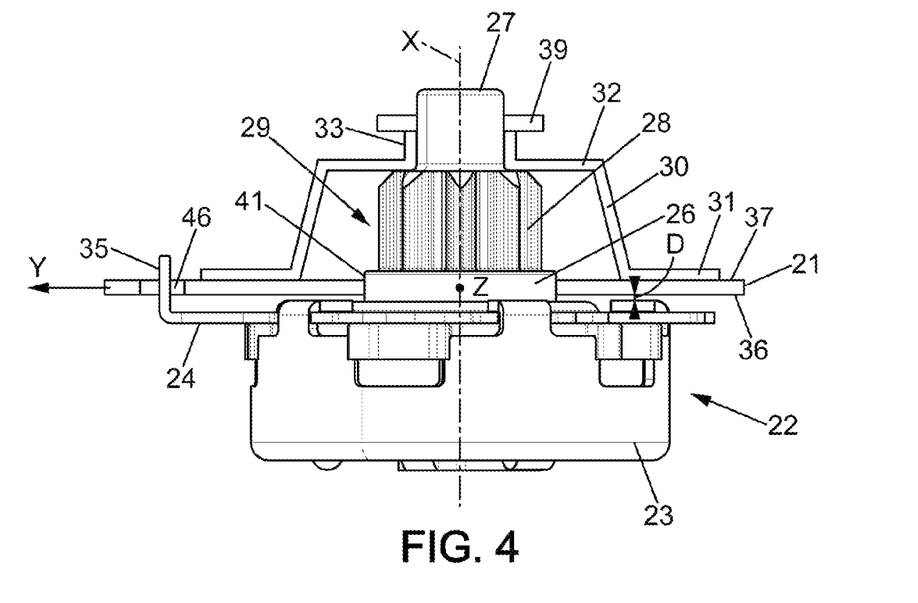
FIG. 4 is a sectional view of another exemplary embodiment of the adjustment assembly.

As illustrated in the example of FIG. 4, the flange 21 comprises an orifice 41 against which the base 26 of the output member 29 bears. In the example of FIG. 4, the shape of the orifice 41 is complementary to that of the base 26. As the base 26 is circular, the orifice 41 is also circular. In addition, the orifice 41 has a diameter slightly greater than that of the base 26 in order to allow rotation of the output member 29 about the X axis, and to allow the output member 29 to bear against the flange 21 without too much play enabling displacement of the output member 29 within the orifice 41. For example, the play between the diameter of the orifice and the diameter of the base 26 is less to 0.1 mm. Thus, due to the rotation of the output member 29, the latter is in rotational contact with the orifice 41. By "rotational contact", it is understood to mean that the output member 29 can rotate about the axis of rotation X while remaining in contact with the flange 21, meaning by bearing against the periphery of the orifice 41. In other words, the contact between the output member 29 and the orifice 41 is a pivoting type of contact, enabling the output member 29 to bear against the orifice 41 and the output member 29 to rotate within the orifice 41. The orifice 41 therefore keeps the output member 29 centered while allowing its rotation. The orifice 41 thus prevents movements of the output member 29 along a radial axis Y or Z (perpendicular to the axis of rotation X), such movements being able to exert unusual forces on the various components of the adjustment mechanism 20. In other words, the reduction of the play between the orifice 41 and the base 26 allows better distribution of the forces on the locking members 49, 50 which will be further described below.

According to another example, not illustrated, the output member 29 comprises an additional guide piece which at least comes to surround the base 26, and at most to cover it. This guide piece is thus in rotational contact with the orifice 41 and constitutes an intermediate part, arranged between the orifice 41 and the base 26. This piece provides the advantages detailed in the paragraph above and also makes it possible to adapt an orifice 41 of a seat portion 21 to an adjustment mechanism which is not specially designed for the diameter of the orifice 41 of the flange 21, or vice versa.

Figure 3:
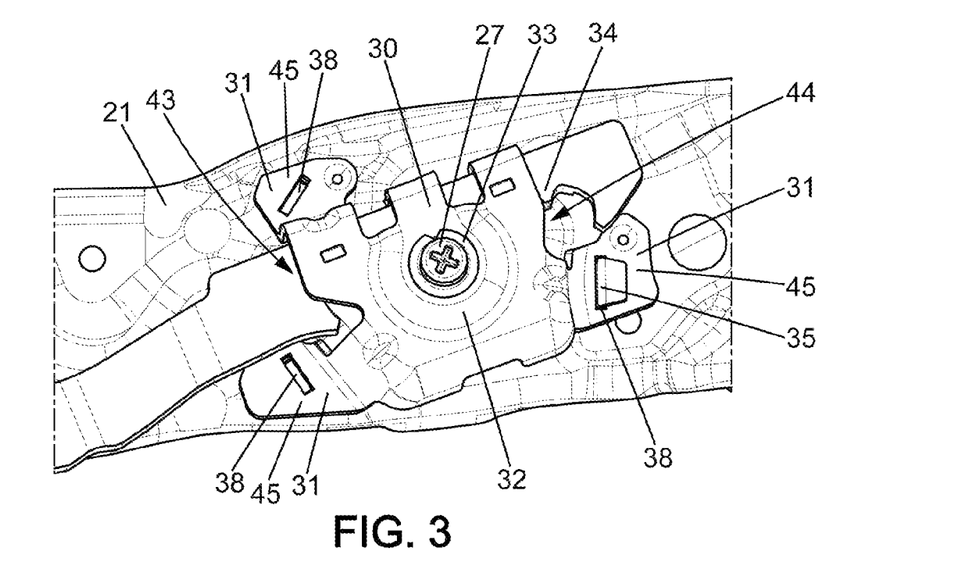
FIG. 3 is a perspective view of the adjustment assembly of FIG. 2, from the side opposite the side illustrated in FIG. 2.

The adjustment mechanism 20 further comprises a backplate 30, illustrated for example in FIG. 3, and schematically in FIG. 4. This backplate 30 is arranged on the adjustment part side as defined above, and covers the output member 29 to protect the engagement created between the pinion 28 and the teeth 34. The backplate 30 comprises a base plate 31 and an upper part 32. These two parts 31, 32 are in contact with the output member 29 on the one hand and with the base and/or the flange 21 on the other hand. More precisely, the base plate 31 is fixed on the flange 21 (and in particular on the second face 37 of the flange 21), while the upper part 32 partially receives the output member 29. In addition, the backplate 30 is arranged so as to create a first and second passage 43, 44 allowing the adjustment means of the seat which meshes with the pinion 28 to move in translation by the rotation of the pinion 28.

The upper part 32 comprises a bearing 33, also visible in FIG. 4. The bearing 33 is for example of complementary shape to the end 27 of the output member 29, so as to allow rotation of the end 27 about the X axis and prevent movements between the adjustment mechanism 20 and the flange 21 along a radial axis (perpendicular to the axis of rotation X) of the output member 29. The bearing 33 is thus a stop against which a part of the pinion 28 comes to rest as does the end 27 of the output member 29. Movements distancing the pinion 28 from the flange 21 (drawing away from the flange 21) are thus limited. Thanks to this bearing 33, the output member 29 is maintained in the X direction and in the radial direction.

The base plate 31 may comprise one or more bridges 45 of attachment to the flange 21, as illustrated for example in FIG. 3, to attach the backplate 30 to the flange 21, for example by welding, crimping, or the like. The attachment bridges 45 are oriented substantially parallel to the flange 21, which allows in particular a larger area of contact and bearing of the backplate 30 on the flange 21. This is particularly advantageous for allowing several areas of attachment of the backplate 30 to the rest of the adjustment assembly 20, thus providing good mechanical strength of the backplate 30 in the event of radial movements of the end 27 which apply forces to the bearing 33.

Figure 5:
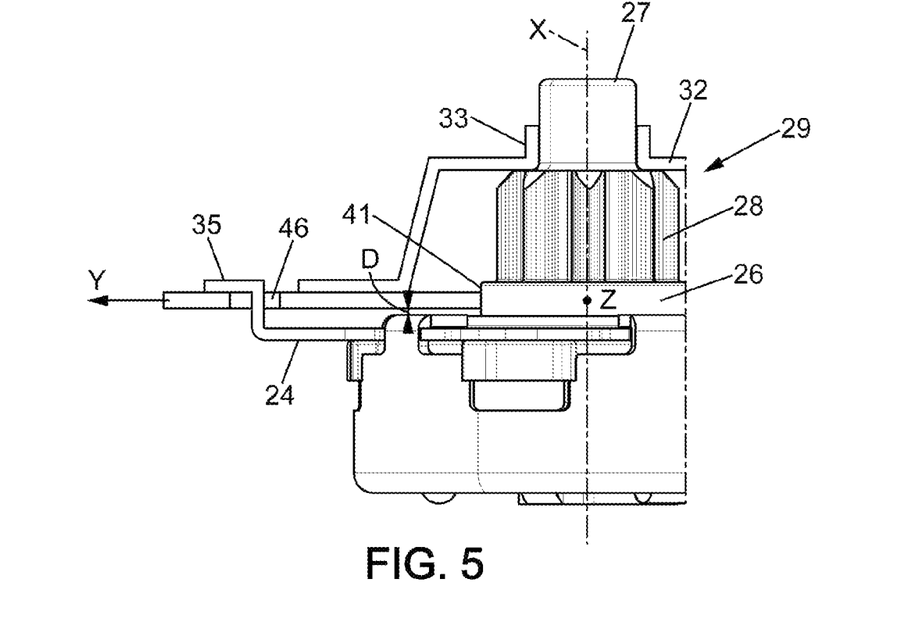
FIG. 5 is a sectional view similar to the view of FIG. 4, of another exemplary embodiment of the adjustment assembly.

In addition, as visible in FIGS. 4 and 5, the housing 22 is spaced apart from the flange 21 by a distance D. This distance D allows the housing 22 to be isolated from the rest of the mechanism in the event for example of the application of torque to the output member 29 around the X axis, and thus to avoid impacts between the housing 22 and the body portion 21.

Each attachment bridge 45 may comprise an opening 38 for receiving an assembly tab 35, which is described below.

The bottom 24 of the housing 22 comprises at least one tab 35. The tab eliminates rotation of the adjustment mechanism 20 about the X axis. The tab 35 is visible in the various examples of FIGS. 3 to 6. The tab 35 passes through the flange 21, via a slot 46. In the example of FIG. 4, the tab 35 is oriented and terminates perpendicularly to the bottom 24. The end of the tab 35 is thus free on the adjustment part side, as defined above.

In the example of FIG. 5, the tab 35 is folded back. More precisely, the tab 35 comprises a portion perpendicular to the bottom 24, this portion passing through the slot 46, then a portion which extends parallel to the bottom 24, this last portion bearing against the flange 21, and in particular against the second face 37 of the flange 21. The bearing of the tab against the flange 21 prevents movement of the output member 29 towards the flange. Consequently, the bearing 33 and the folded tab 35 prevent translational movements of the output member 29 along the X axis, whether these are movements towards or away from the flange 21.

In the example of FIG. 3, the tab 35 is folded as in the example of FIG. 5. This configuration eliminates the last degree of freedom of the adjustment mechanism 20, meaning translation along the X axis. In another type of arrangement, this tab 35 could be replaced by punching both the bottom 24 and the flange 21 in order to achieve complete attachment of the adjustment mechanism 20, meaning a stopping of rotation and translation along the X axis, via a rivet or a screw/nut system for example. Alternatively, a weld could replace the punching.

Alternatively, when the assembly tab(s) 35 do not bear against the backplate 30 and/or the second face of the flange 21, the adjustment mechanism may comprise a self-locking washer 39 (FIG. 4). The self-locking washer 39 is arranged around the end 27 of the output member 29 and against the upper part 32 of the backplate. For example, the washer 39 is arranged against the bearing 33 of the backplate 30. The self-locking washer 39 performs a function identical to the folded tab 35, meaning the translational movements along the X axis, and in particular prevents movement of the output member 29 towards the flange as well as movement of the assembly of the adjustment mechanism 20 along the X axis. Alternatively, the self-locking washer could be replaced by a nut.

The bearing of the tab against the backplate 30 and/or the second face 37 of the flange 21, or the self-locking washer 39, makes it possible to block translational movements of the housing 22 and of the output member 29 along the X direction.

Figure 6:
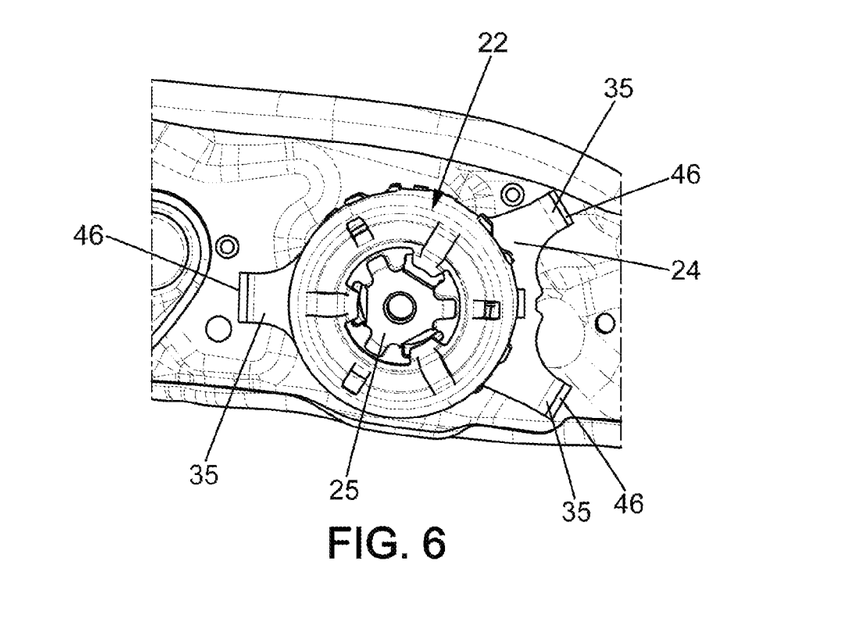
FIG. 6 is a front view similar to FIG. 2, of another exemplary embodiment of the adjustment assembly.

According to another example illustrated in FIG. 6, the bottom 24 comprises three tabs 35. Each of these tabs has, as previously described, the function of eliminating the possible rotation of the adjustment mechanism about the X axis. In this case, the flange 21 comprises three slots 46 each allowing a tab 35 to pass through. Alternatively, the attachment bridges 45 also include three openings 38, for each of the three tabs 35.

Figure 7:
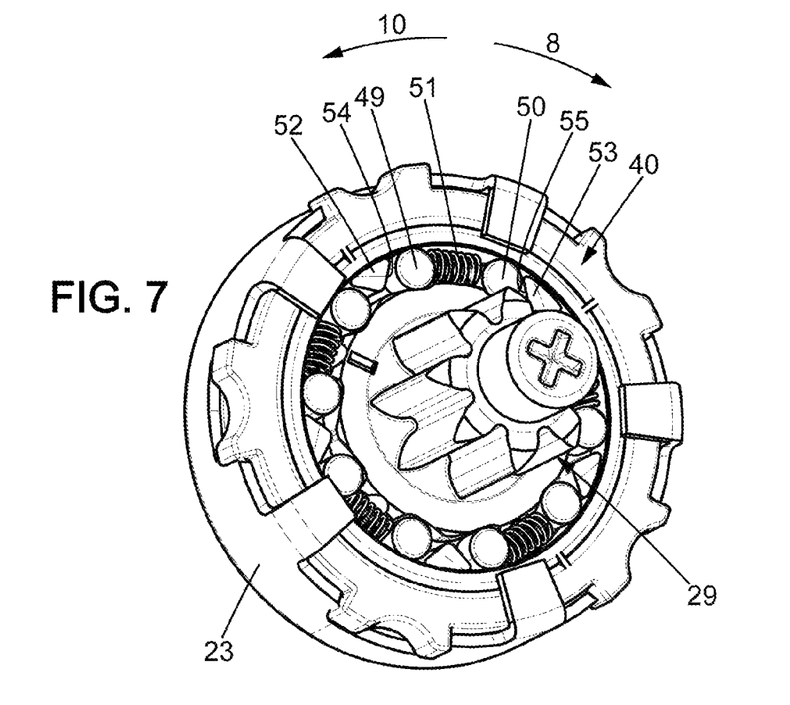
FIG. 7 is a perspective view of part of the adjustment mechanism according to the disclosure.

As can be seen in FIG. 7, the adjustment mechanism 20 further comprises a pumping mechanism 40, of which the operation is known per se and detailed for example in patent document FR 2 809 355 A1. A pumping mechanism makes it possible to maneuver a seating portion of a seat up or down by a "pumping" movement. By this movement, a lever is actuated upwards to raise the seating portion and returns to its rest position without movement of the seating portion. The seating portion is raised gradually, the lever being actuated upwards as many times as necessary to obtain the desired height of the seating portion. The operating principle for lowering the seat is the same, except that the lever is actuated downwards. For this purpose, the pumping mechanism 40 is enclosed in the housing 22. The pumping mechanism 40 is connected to the input member 25 and to the output member 29. More precisely, the pumping mechanism 40 is configured to drive the pinion 28 in rotation when the input member 25 moves in the first direction 8 starting from the rest position N or in the second direction 10 starting from the rest position N, and to immobilize the pinion 28 when the input member 25 resiliently returns to its rest position N after having moved in the first direction 8 or the second direction 10 starting from the rest position N.

In particular, the pumping mechanism 40 comprises a plurality of first and second locking members 49, 50 and their respective springs 51 (for example five first members 49 and five second members 50) which are provided to immobilize the output member 29 relative to the housing 22.

In addition, the first and second locking members 49, 50 of each pair of locking members are framed by a pair of first and second axial fingers 52, 53, with some backlash.

More precisely, each first axial finger 52 has a first stop face 54 adapted to move the corresponding first locking member 49, and each second axial finger 53 has a second stop face 55 adapted to move the corresponding second locking member 50.

When the lever 7 is actuated by a user and causes the pumping mechanism 40 to pivot as explained above, for example in the second angular direction 10 starting from the rest position N (meaning within the second angular sector 11), the stop face 55 of each finger 53 moves the corresponding second locking member 50 in the second angular direction 10, which unlocks this second locking member 50.

After unlocking the second locking members 50, the first locking members 49 urge the output member 29 in angular direction 10 under the effect of the springs 51.

At the end of actuation of the lever 7, during the return of this lever to its rest position N, the pumping mechanism 40 remains stationary, so the output member 29 remains stationary. If the user performs several "pumping" movements within the second angular sector 11, the output member 29 thus undergoes several successive rotations in the same angular direction 10.

The operation of the device is the same, mutatis mutandis, if the lever 7 is actuated repeatedly within the first angular sector 9.

Figure 8:
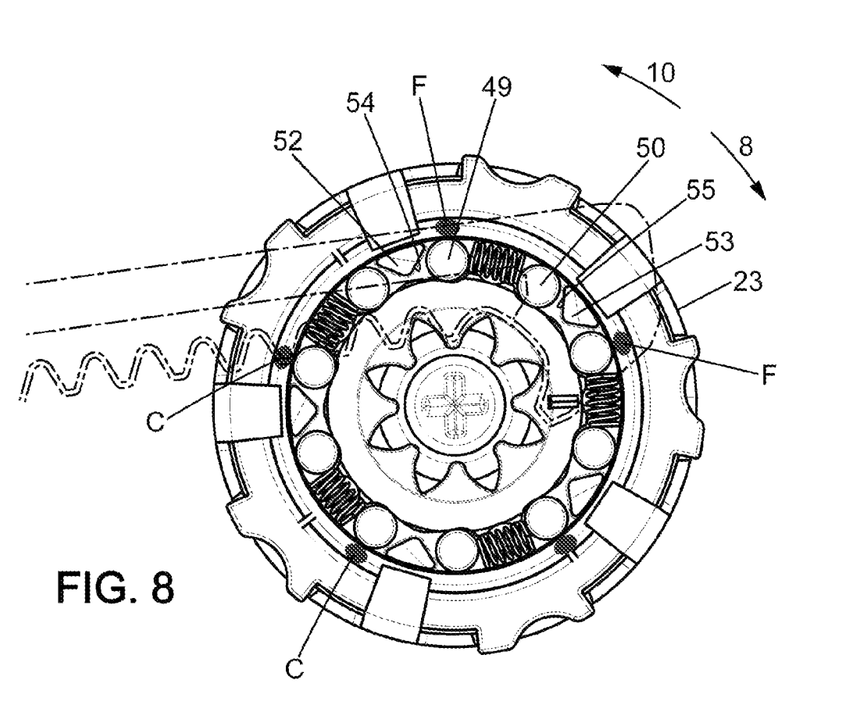
FIG. 8 shows the distribution of stresses on the mechanism of FIG. 7, in the event of an accident.
Figure 9:
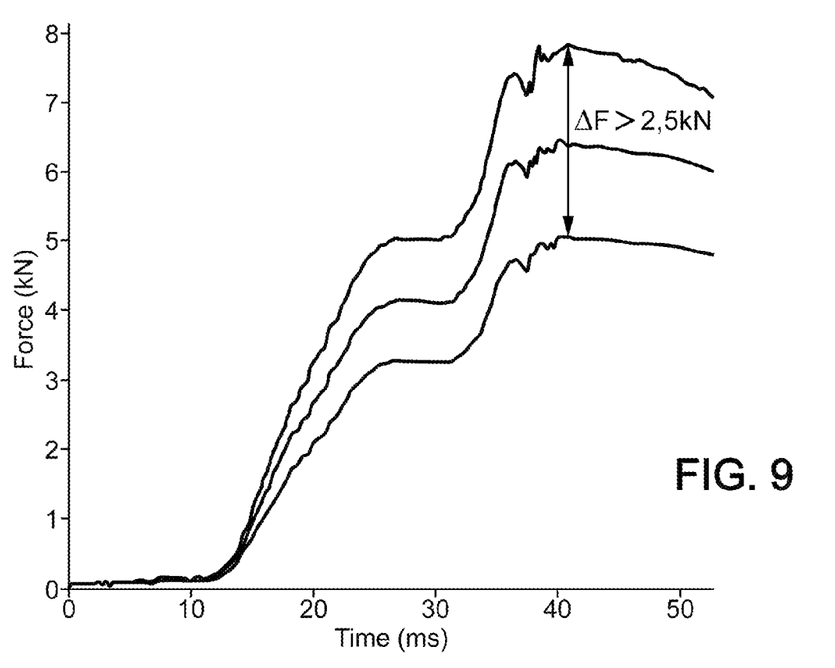
FIG. 9 shows the evolution of the stresses applied to the locking members of the adjustment mechanism of the prior art over time, during an accident.

When the vehicle is involved in an accident, very significant forces are undergone by the seat, and consequently a very large torque exerted on the output member 29 may result. More precisely, in the event of an accident, the teeth 34 of the adjustment means on the seat 1 exert significant force on the pinion 28, which itself causes unusual force F on the adjustment mechanism, illustrated schematically in FIG. 8. More precisely, the teeth 34 apply torque to the pinion, around the X axis. The locking system should withstand a tangential load exerted on the pinion, but also part of the radial load, distributed at the area of contact between the pinion and the flange and on the locking members 49, 50. FIG. 9 graphically represents the distribution of the forces applied to the locking members in a known adjustment mechanism. Each curve in the graph of FIG. 9 corresponds to the force applied to one or the other of the first or second locking members 49, 50 depending on whether the force tends to rotate the pinion 28 in the first or second angular direction 8, 10. One will observe that the forces applied to the locking members are unequal, schematically illustrated by the difference ΔF. This difference ΔF represents the difference between the greatest force (upper curve) exerted on one of the locking members and the lowest force (lower curve) exerted on another of the locking members. Here the difference ΔF is greater than 2.5 kN for a force applied for 40 ms. The adjustment mechanism in FIG. 9 comprises 5 pairs of locking members. The greatest force and the lowest force on two different locking members are noted; it follows that only three curves are visible. The imbalance in the distribution of loads on the various locking members 49 or 50 can lead to an unlocking of the pumping mechanism 40 and therefore a rotation of the output member 29.

Figure 10:
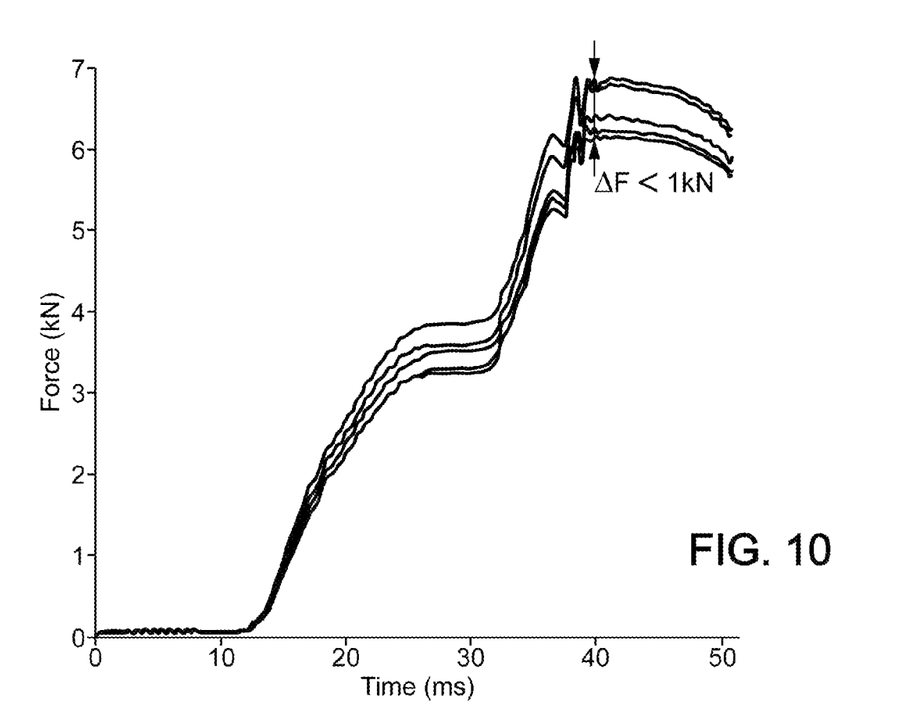
FIG. 10 shows the evolution of the stresses applied to the locking members of the adjustment mechanism of the disclosure over time, during an accident.

On the other hand, with the disclosure the forces are distributed evenly, residing in the fact that the adjustment mechanism 20 is primarily fixed via the pinion (which provides long guidance of the pinion as described above). In particular, the radial load applied to the pinion 28 is supported by both the base 26 and the end 27, and the tangential load applied to the pinion (generating torque around the X axis) is homogeneously supported by the locking system, as shown in FIG. 10. The uniform distribution of forces on the locking members allows better locking of the pumping mechanism 40. As a result, the adjustment assembly is more resistant to the radial loads to which the adjustment mechanism 20 may be subjected, so as to maintain the irreversibility of the adjustment assembly.

A comparative mechanism allows adjustments of an element driven by an output assembly, by applying one or more movements on an actuating means.

In the comparative mechanism, the output assembly is locked by pairs of locking members which, in the event of a very large torque undergone by the output member, for example in the event of a vehicle accident, can be unevenly stressed. This may result in a detrimental limitation of the locking torque, which leads to an unlocking of the comparative adjustment mechanism. The present disclosure aims to strengthen the resistance to torques exerted on the output assembly of the mechanism.

The invention claimed is:

1. An adjustment assembly for a motor vehicle seat, comprising an adjustment mechanism and a flange that is part of a seat frame, the adjustment mechanism comprising:
    a housing, itself comprising a bottom and a cover,
    an output member having a base, an end opposite the base, and a pinion extending along a longitudinal direction between the base and the end, the pinion being mounted to pivot about an axis of rotation,
    a backplate comprising a base plate fixed to the flange and an upper part intended to partially receive the output member,
    a pumping mechanism housed in the housing and configured to drive the pinion in rotation,
    wherein the output member is in contact in the flange and in the upper part, the flange and the upper part allowing rotation of the output member about the axis of rotation, and wherein the bottom of the housing:
    comprises at least one assembly tab passing through the flange, the flange having a first face arranged on the housing side and a second face arranged on the output member side, the assembly tab bearing against the second face of the flange, and
    is spaced apart from the first face of the flange by a distance D along the longitudinal direction.

2. The adjustment assembly of claim 1, wherein the base plate of the backplate comprises an opening for receiving the assembly tab, said assembly tab passing through the backplate and bearing against the backplate, on the side opposite the housing.

3. The adjustment assembly of claim 1, wherein the bottom of the housing comprises three tabs and the base plate of the backplate comprises three openings to receive the assembly tabs, said assembly tabs passing through the backplate and bearing against the backplate, on the side opposite the housing.

4. The adjustment assembly of claim 1, wherein the adjustment mechanism further comprises a self-locking washer arranged on the end of the output member and bearing against the upper part of the backplate.

5. The adjustment assembly of claim 1, wherein the flange comprises an orifice in contact with the base of the output member in order to prevent movements of the output member along a radial axis while allowing rotation of the output member within the orifice.

6. The adjustment assembly of claim 1, wherein the output member comprises an additional guide piece surrounding the base, and wherein the flange comprises an orifice in contact with the base of the output member in order to prevent movements of the output member along a radial axis while allowing rotation of the output member within the orifice.

7. The adjustment assembly of claim 1, wherein the upper part of the backplate comprises a bearing in contact with the end of the output member, in order to prevent movements of the adjustment mechanism relative to the flange along a radial axis of the output member while allowing rotation of the output member within the orifice.

8. The adjustment assembly of claim 1, wherein the pumping mechanism is connected to an input member and to the output member,
    the input member being mounted to pivot relative to the housing about an axis of rotation, this input member being resiliently biased towards a rest position and being movable in a first direction starting from the rest position, within a first angular sector, and in a second direction opposite to the first direction starting from the rest position, within a second angular sector, and
    wherein the pumping mechanism rotates the output member when the input member moves in the first direction starting from the rest position or in the second direction starting from the rest position.

9. The adjustment assembly of claim 8, wherein the pumping mechanism further comprises a plurality of first and second locking members provided to immobilize the output member during the resilient return of the input member to the rest position.

10. A motor vehicle seat comprising an adjustment assembly according to claim 1.

* * * * *